── ── ── ── ──

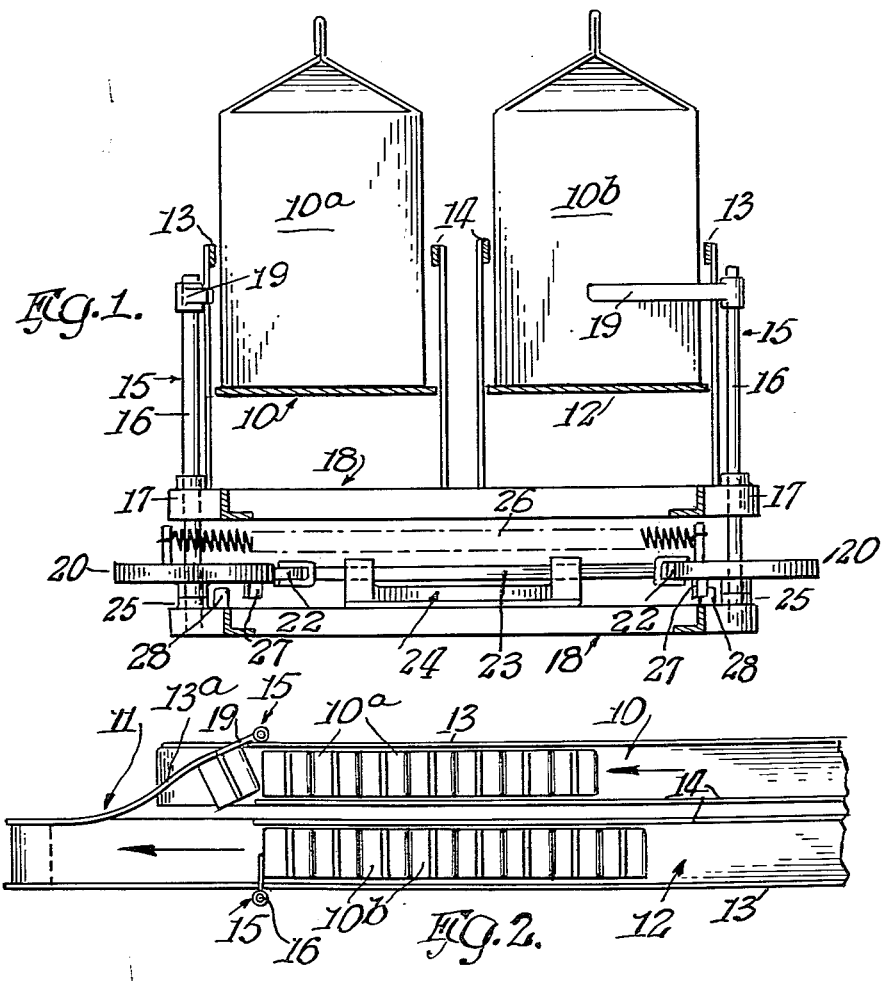
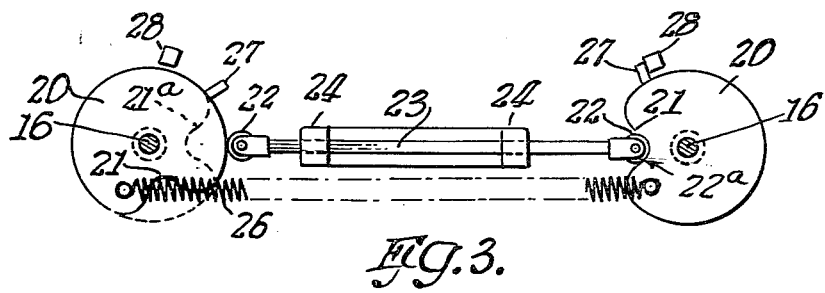

3,064,792
CONVEYOR TRAFFIC CONTROLLER
Warren Du Broff, 350 Carol Court, Highland Park, Ill.
Filed May 16, 1961, Ser. No. 110,416
3 Claims. (Cl. 198—32)

This invention relates to a conveyor traffic controller, and, more particularly, to a mechanical arrangement for horizontally traveling conveyor lines adapted to merge streams of articles advanced thereby.

The instant invention has particular utility in the bottling field. There, a number of filling machines may be employed simultaneously and it has been found desirable to merge the outputs for checking, packing, etc. Heretofore, there has existed the problem of avoiding blockage—two articles simultaneously trying to enter the space adapted to admit only one—which is necessarily the physical arrangement involved in merging two streams of articles.

It is a general object of this invention to provide a novel apparatus for governing the flow of articles in an environment such as has just been described, i.e., the merging of articles from two conveyor streams.

Another object is to provide a control mechanism whereby the first article to reach a point of merger automatically and mechanically blocks articles being advanced on a second and adjoining conveyor.

Other objects and advantages of this invention may be seen in the details of construction and operation set down in this specification.

The invention will be explained in conjunction with an illustrative embodiment in the accompanying drawing, in which—

FIG. 1 is a fragmentary elevational view, partially in section, of apparatus embodying teachings of this invention;

FIG. 2 is a top plan view, in fragmentary form, showing the inventive construction of FIG. 1; and FIG. 3 is a schematic plan view showing some of the operative elements of the inventive construction.

In the illustration given, and with particular reference to FIG. 2, the numeral 10 designates a conveyor adapted to transport articles such as a carton 10a horizontally toward a point of merger generally designated 11.

A second conveyor generally designated 12 conveys similar articles 10b toward the merger point 11. Each conveyor preferably has a smooth top surface so that the conveyor may advance continuously but that the articles supported thereon may be maintained more or less stationary with the conveyor passing thereunder. It is contemplated, in the illustration given, that the articles 10a will leave the conveyor 10 and merge with the articles 10b on the conveyor 12 and then proceed to a subsequent processing station. Therefore, it is unnecessary to have the conveyor 10 coextensive with the conveyor 11, and such is indicated in FIG. 2.

As can be appreciated from FIG. 1, each conveyor is equipped with guide rails 13 and 14 confining lateral movement of the articles 10a and 10b on their respective conveyors. The guide rail 13 associated with conveyor 10 is angled toward the conveyor 12 as at 13a to provide the merging operation.

Just prior to the point where the guide rail 13 is angled as at 13a, each conveyor is equipped with a stop member generally designated 15.

Each stop member 15 includes a vertically oriented post 16 which is journaled in a bearing 17 provided as part of the conveyor supporting frame 18. The extreme upper portion of the member 15 is equipped with a flag 19 adapted to extend across the associated conveyor in blocking relation with articles proceeding along the conveyor. In the illustration given, the flag 19 associated with conveyor 12 is seen to be in that blocking relation, while the flag 19 associated with conveyor 10 is seen to be in unblocking position, permitting the article 10a to proceed onto the conveyor 12.

For this purpose, each post is equipped with a cam element 20 (seen in plan view in FIG. 3). Each cam 20 is equipped with a recess 21 which is adapted to receive the cam follower end 22 of a horizontally disposed bar or linkage element 23. For this purpose, the frame 18 is equipped with a sleeve bearing as at 24 (see FIG. 1). The frame also provides thrust bearing 25 for the lower end of the posts 16.

Interconnected between the cams 20 is a spring 26 which urges the cams to a position in which the recesses are in aligned parallel relation, the left-hand cam 20 in FIG. 3 being urged counterclockwise. Limiting the urging of the spring 26 is a projection 27 provided on each cam, which is adapted to abut a stop element 28 provided as part of the frame 18. Thus, when there is no article 10a or 10b being urged against a flag 19, the right-hand cam 20 of FIG. 3 will be in the position shown, while the left-hand cam 20 will be positioned with its recess 21 in the dotted line position designated by the numeral 21a in FIG. 3.

However, as an article 10a or 10b, as the case may be, engages the flag 19 associated with the particular conveyor involved, the flag is pivoted forwardly to permit the article to pass, which is accompanied by corresponding rotational movement of the associated cam 20. In the illustration given, this is the left-hand cam, and as the cam 20 pivots, the associated cam follower 22 is moved out of the detent or recess 21 to ride against the periphery of the cam. This results in urging the linkage 23 to the right and seating the cam follower end 22a of FIG. 3 firmly within the recess of the cam 20. It is to be understood that the cam profile is so arranged that once a cam movement is started, the other cam requires considerably greater force exerted thereagainst to stop the operation. Thus, the right-hand cam remains in the position seen in the drawing irrespective of the fact that one or more articles 10b may be urged against it.

While, in the foregoing specification, a detailed description of an embodiment of the invention has been set forth in detail to acquaint those skilled in the art with the invention, many variations in the details herein given may be made by those skilled in the art without departing from the spirit and scope of the invention.

I claim:

1. In a conveyor system, a frame, a pair of conveyors supported on said frame in parallel relation, guide means positioned adjacent said conveyors for merging articles on said conveyors, a stop for each conveyor pivotally mounted on said frame adjacent the merger point, and mechanical means interconnecting said stop members for positioning one stop member in blocking relation with articles on its associated conveyor when the other stop member is pivoted into unblocking relation relative to articles on its associated conveyor, both of said members being biased to blocking relation relative to articles on their respective conveyors, each member being equipped with a detent element, and a linkage extending between said element selectively positionable in the detents thereof.

2. In apparatus of the character described, a frame supporting a pair of horizontally traveling conveyors, guide rail means beside said conveyors arranged to direct articles from one conveyor onto the other whereby two streams of articles may be merged, a stop member on said frame for each conveyor and positioned just prior to the point of merger, means on each stop member for biasing said member into blocking relation with articles approaching said member, each stop member comprising a vertically-disposed shaft journaled in said frame, a cam fixed to said shaft, and a bar extending between said cams and mounted for horizontal reciprocal action on said frame, said cams each being equipped with profiles for receipt of ends of said bar with said bar arranged to be received in selective locking relation with said cams.

3. In a conveyor traffic controller, a frame, a pair of conveyors movably mounted on said frame and adapted to transport articles in generally horizontal parallel paths, a guide rail extending across one conveyor for directing articles from said one conveyor toward and onto the other conveyor, a stop member adjacent each conveyor preceding said rail in the path of article travel, said stop members each including a vertical post journaled in said frame and equipped with a flag portion extending over said conveyor in blocking relation with articles being advanced on said conveyors, spring means interconnecting said stop members urging both members into said blocking relation, means on said frame limiting the urging of said spring, each post being equipped with a cam having a recess in the periphery thereof, said recesses being vertically aligned and being in parallel relation when both members are in blocking relation, a bar mounted on said frame between said cams and equipped with cam follower ends, said ends being adapted to be moved into said recesses, said bar having a length such that when one cam follower end is contacting a portion of its associated cam other than the recess portion thereof, the other cam follower end is in its associated cam recess to maintain its associated flag portion in blocking relation with articles being advanced on its associated conveyor.

References Cited in the file of this patent
UNITED STATES PATENTS
1,853,787   Twomley _____ Apr. 12, 1932